United States Patent
Mayer et al.

(10) Patent No.: US 7,257,813 B1
(45) Date of Patent: Aug. 14, 2007

(54) SYSTEM AND METHOD FOR A CONTROL UNIT WITH A SCHEDULER PREVENTING SIMULTANEOUS ACTIVATION OF MODULES FROM INTERFERENCE

(75) Inventors: Rudi Mayer, Vaihingen (DE); Holger Bellman, Ludwigsburg (DE); Gudrun Menrad, Stuttgart (DE); Dieter-Andreas Dambach, Korntal-Muenchingen (DE); Jürgen Wolf, legally incapacitated, Karlsruhe (DE); by Heinz Mohl, legal representative, Karlsruhe (DE); Rainer Frank, Sachsenheim (DE); Hans Hillner, Karlsruhe (DE); Juergen Schiemann, Markgroeningen (DE); Georg Mallebrein, Singen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/118,234

(22) Filed: Jul. 17, 1998

(30) Foreign Application Priority Data

Jul. 19, 1997 (DE) ................................ 197 31 116

(51) Int. Cl.
*G06F 9/46* (2006.01)
*G05B 23/02* (2006.01)
(52) U.S. Cl. ........................ 718/102; 340/3.1
(58) Field of Classification Search ................ 709/100, 709/200; 705/8; 73/119; 340/825, 3.1; 700/95; 718/1–108
See application file for complete search history.

(56) References Cited

U.S. PATENT DOCUMENTS

| | | | | |
|---|---|---|---|---|
| 4,437,342 A | * | 3/1984 | Hosaka et al. ............. 73/119 A |
| 4,571,674 A | * | 2/1986 | Hartung ....................... 711/160 |
| 4,780,821 A | * | 10/1988 | Crossley ....................... 718/100 |
| 4,831,540 A | * | 5/1989 | Hesser ......................... 700/113 |
| 5,005,172 A | * | 4/1991 | Kawamoto .................... 714/31 |
| 5,070,453 A | * | 12/1991 | Duffany ......................... 705/8 |
| 5,383,116 A | * | 1/1995 | Lennartsson ................... 700/9 |
| 5,561,742 A | * | 10/1996 | Terada et al. ................ 700/255 |
| 5,590,045 A | * | 12/1996 | Kaak et al. .................. 700/139 |
| 5,636,124 A |   | 6/1997 | Rischar et al. |
| 5,666,651 A | * | 9/1997 | Wang .......................... 455/512 |
| 5,969,631 A | * | 10/1999 | Ammler et al. ......... 340/825.21 |

FOREIGN PATENT DOCUMENTS

| | | |
|---|---|---|
| DE | 43 15 494 | 9/1994 |
| DE | 43 26 327 | 9/1994 |
| DE | 44 10 775 | 10/1995 |
| DE | 195 00 957 | 1/1996 |
| DE | 44 45 651 | 6/1996 |
| DE | 196 38 166 | 3/1998 |
| EP | 269 738 | 6/1988 |
| EP | 415 445 | 3/1991 |
| WO | WO97/13064 | 4/1997 |

\* cited by examiner

*Primary Examiner*—Meng-Al T. An
*Assistant Examiner*—Kenneth Tang
(74) *Attorney, Agent, or Firm*—Kenyon & Kenyon LLP

(57) ABSTRACT

A control unit for a system and a method of operating a control unit have modules that are activated. Before activation of a certain module, inquiries are made to detect cross-dependencies with other modules that have already been activated. To do so, a first storage device and a second storage device containing this information are provided. A scheduler prevents modules which interfere with one another from being activated simultaneously.

24 Claims, 2 Drawing Sheets

| I | II | III |
|---|---|---|
| X | A B | C |
| Y | A D | B D |
| Z | A | – |

Fig. 2

| IV | V |
|---|---|
| A | B C D |
| B | C |
| C | – |
| D | B |

Fig. 3

SYSTEM AND METHOD FOR A CONTROL UNIT WITH A SCHEDULER PREVENTING SIMULTANEOUS ACTIVATION OF MODULES FROM INTERFERENCE

FIELD OF THE INVENTION

The present invention relates to a controller for a system and a method of operating the controller.

BACKGROUND INFORMATION

A diagnostic device for an engine control unit is known from International Published Patent Application No. WO 97/13064, which describes various diagnostic function modules that are activated by a scheduler. The diagnostic function modules check the systems required for the operation of the engine. The scheduler can block certain diagnostic function modules when the diagnostic function module can be expected to indicate a fault on the basis of faults already discovered.

SUMMARY OF THE INVENTION

The control unit according to the present invention for a system and the method according to the present invention for operating a control unit have the advantage over the related art that the cross-dependencies between running modules are taken into account in activating additional modules. Since the information on the cross-dependencies is provided in a first storage device, this information is compiled centrally. Therefore, additional modules can easily be added or removed again. The mutual dependencies among the modules can be taken into account especially easily for all modules owing to the central storage. This is especially important when calling up a certain module which observes system states that are interfered with by other modules. In such a case, faulty information can be generated due to the observation of interfered with states.

It is especially easy to prevent activation of the additional module or to deactivate a module that has already been activated. In the first storage device, only the cross-dependencies between the modules or, in addition, information about disturbances in states of the system and/or observation of states of the system can be stored by the above-mentioned modules. The modules and the scheduler can be implemented especially easily as a software program for a microprocessor. Tables or matrices in the memory of the control unit are expediently used as storage devices.

BRIEF DESCRIPTION OF THE DRAWINGS

FIG. 2 shows an arrangement of the information in a first storage device according to the present invention.

FIG. 3 shows another arrangement of the information in the first storage device according to the present invention.

DETAILED DESCRIPTION

Figure 1:
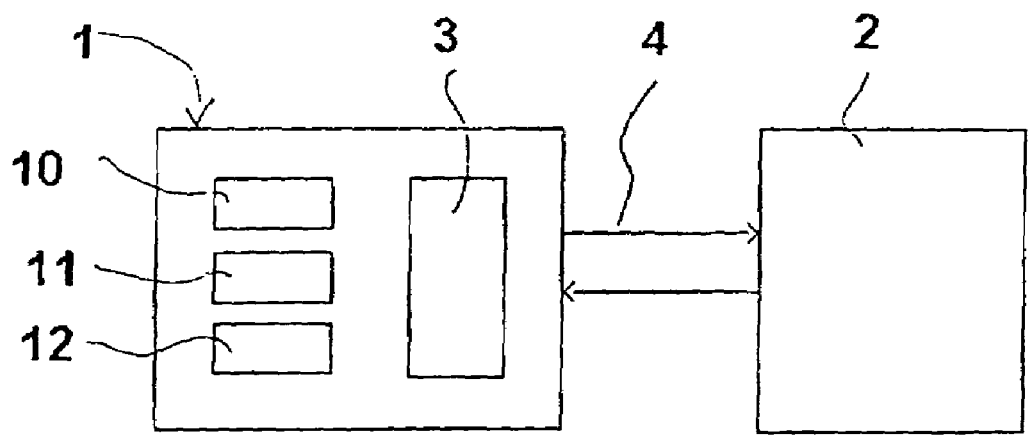
FIG. 1 shows a control unit and the system according to the present invention.

FIG. 1 shows a control unit 1 which is connected by connecting lines 4 to a system 2 to be controlled. Control unit 1 has a microprocessor 3 which is provided for processing modules 10, 11, 12. Of the modules shown here, module 10 is a function module, module 11 is a diagnostic module, and program module 12 is designed as the scheduler.

System 2 may be any technical system that is controlled by a control unit 1. For example, system 2 may be a motor vehicle, an internal combustion engine, or a transmission. Such a system 2 is equipped with a plurality of sensors and a plurality of actuators. Control information generated by control unit 1 can be transmitted over connecting lines 4 to the actuators of system 2 (arrow pointing to system 2). In addition, values measured by sensors of system 2 can be transmitted over the connecting lines to control unit 1 (arrow pointing to control unit 1). Control unit 1 thus receives information about states of system 2, which is processed by control unit 1 and converted to control information for the system 2 in accordance with the desired states (for example, the gas pedal position in the vehicle).

Control unit 1 is represented here only schematically by multiple modules 10, 11, 12 and microprocessor 3. Other hardware components with which those skilled in the art are familiar are not shown. Modules 10, 11, 12 are usually designed as program modules, but hardware components that perform certain functions can also be used. A program module is a sequence of program commands which can be activated or deactivated as a unit by a scheduler. Functions which appear as a unit to the user or are used to control a uniform function can be divided into multiple modules administered separately by the scheduler 12. In addition, only a single function module 10, a single diagnostic module 11 and a single scheduler 12 are shown. A plurality of corresponding modules 10, 11 are of course provided to perform complex control and diagnostic functions. The function modules 10 are necessary for processing the immediate control functions, i.e., they analyze sensor information of system 2 and generate corresponding control information for system 2 according to predetermined setpoints. With a motor vehicle, for example, the input signal of such a function module 10 may be the rpm, and the setpoint information may be the gas pedal position, for which corresponding control information for the engine is then generated. Diagnostic modules 11 have the function of monitoring the proper functioning of system 2. Because of statutory regulations, for example, the functioning of the catalyst in a motor vehicle must be checked during ongoing operation. This is done by activating from time to time a diagnostic module 11 which checks the function of the catalyst by analyzing the signals of the lambda probe.

Function modules 10 and diagnostic modules 11 may be in an active state or an inactive state. In the inactive state, the functions associated with the modules 10, 11, such as diagnosis or control of parts of the system, are not carried out. This means in particular that inactive modules 10, 11 do not receive any data from the system 2 and do not output any information to system 2. In the inactive state, however, the modules 10, 11 can still exchange information with the microprocessor 3; in particular, it must be possible to exchange information concerning activation of a module (e.g., the possibility of or a request for activation) between the modules 10, 11 and the scheduler 12. Not all modules 10, 11 are needed in all operating states of system 2, so at least some of these modules 10, 11 may be in an active or an inactive state. Individual function modules 10 or diagnostic modules 11 are activated by a sequence control that decides which function modules 10 or diagnostic modules 11 are to be executed. Scheduler 12 is part of this sequence control. The sequence control can make the activation of individual function modules 10 or diagnostic modules 11 dependent upon certain external conditions. For example, function modules 10, which are associated with the ignition or injection of a gasoline engine, are activated as a function of the crankshaft position of the engine. Likewise, diagnostic modules 11 are activated as a function of operating states of system 2. Multiple function modules 10 and multiple diagnostic modules 11 can be processed in parallel, in the sense that the processing of one module is not yet concluded while another module is also being processed at the same time. One problem with this is that certain modules supply faulty information when certain other modules 10, 11 are activated at the same time. For example, activated carbon filters are provided with modern vehicles to prevent vaporized hydrocarbons from the tank from entering the environment. Then for a limited period of time in ongoing operation of the engine, air is taken in through this activated carbon filter, and the hydrocarbons present in the filter are burned in the engine, so that the filters are cleaned again by this measure. However, this is associated with interference in the lambda probe signal, so that diagnosis of the catalyst is impossible during the cleaning of the activated carbon filter. Thus, diagnostic module 11 for checking the catalyst must not be activated while function module 10 for cleaning the activated carbon filter is activated. In addition, function modules 10, e.g., for carburation, are also interfered with during this cleaning.

Figures 2, 3:
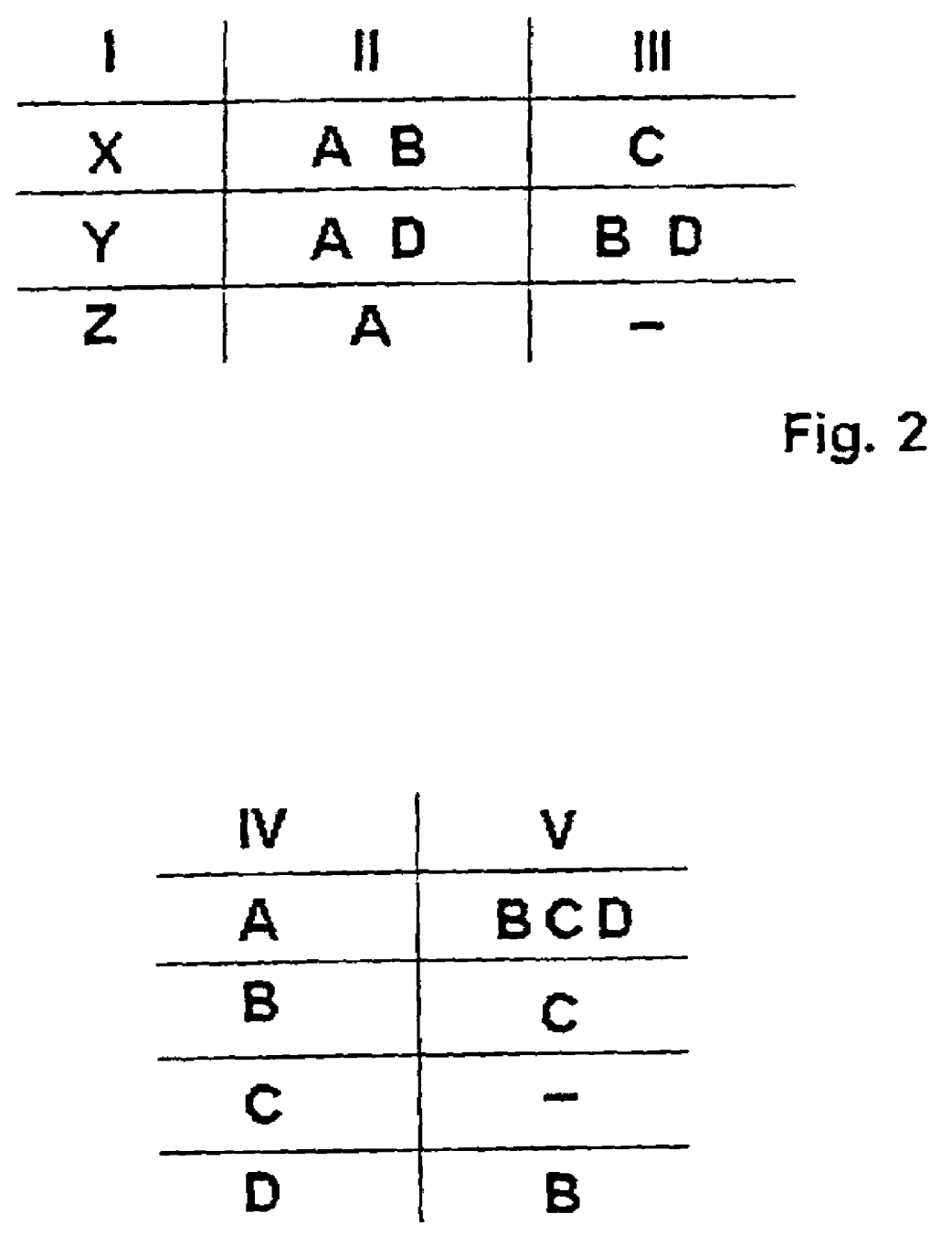

To take into account this cross-dependency between the modules 10, 11, the present invention calls for a scheduler 12 which takes these cross-dependencies into account by analyzing storage device. FIG. 2 shows the content of a first memory to which the scheduler has access. X, Y and Z in FIG. 2 denote physical states of the system 2 which have an influence on sensor signals of the system 2. Column I lists three different states of system X, Y and Z. These system states are either influenced or observed by program modules, labeled here as A, B, C and D. Furthermore, a module may observe a state and influence it at the same time (module D appears in column II and III). When a module influences a state in such a way that other modules observing this state supply faulty results because of this influence, this is interference between these modules which comes about indirectly due to interference in a state by at least one of the modules. For example, when a state is needed as a necessary parameter for a calculation by a module, a misdiagnosis or faulty control pulses may occur due to interference with other modules.

Column II lists the modules which observe the corresponding states, and column III lists the interfering modules. State X, for example, is observed by program modules A and B and is interfered with by program module C. State Y is observed by module A and interfered with by module B. State Z, for example, is observed only by module A and is not interfered with by any module. When module A is to be activated, scheduler 12 accesses the tables shown in FIG. 2 and ascertains that module A observes state X, state Y, and state Z. Since states X and Y are interfered with by modules C and B, module A is enabled for activation only if modules C and B are not activated. In addition, module A also observes state Z, which is not, however, influenced by any other module. This could be useful for expansion of the control unit; in particular, other modules which might have an influence on state Z can easily be entered in the table created in FIG. 2.

The information stored in FIG. 2 can be stored in any storage device or in any other form, e.g., as a matrix. It is essential only that a storage device be provided on the basis of which it is possible to determine which modules have cross-dependencies, i.e., which modules must not be activated simultaneously on the basis of existing cross-dependencies. It is also important that function modules 10 or diagnostic modules 11 can be added to or removed from the control unit 1 easily by deleting or adding the individual modules and making a suitable entry in the storage device. In addition, complicated cross-dependencies between different modules can thus be taken into account in a very clear way.

The table shown in FIG. 2 contains an excess of information, or a certain redundancy, inasmuch as only columns II and III are actually needed to determine cross-dependencies between the modules. The reason for column I is that it makes reconstruction of the cross-dependencies especially simple. This simplifies the addition of new modules, because it is usually known which states a new module needs (column II) and which states a new module interferes with (column III). Thus, as an alternative, only columns II and III may be stored in the first storage device. FIG. 3 shows a corresponding representation. The representation in FIG. 3 shows the same information as columns II and III in FIG. 2 in a different representation. Column IV lists the modules, and column V lists the interfering modules. FIG. 3 shows that module A is interfered with by modules B, C and D, module B is interfered with by module C, module C is not interfered with by any other module, and module D is interfered with by module B. The table according to FIG. 3 may be part of the fixed program, or it may be created in initialization the computer. According to the table in FIG. 3, two modules interfere with one another when at least one of the modules is entered in column IV and the other is entered in the same line in column V.

Figure 4:
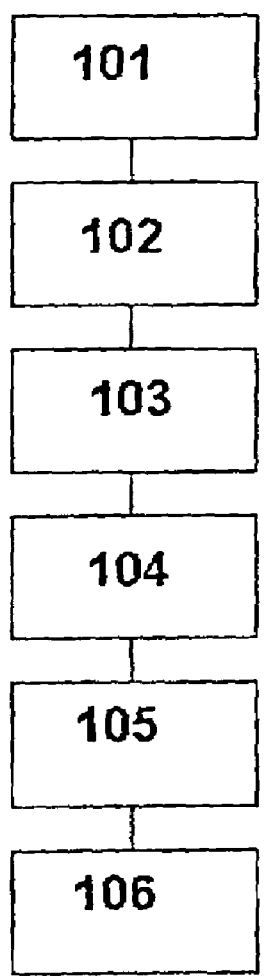
FIG. 4 shows a flow chart corresponding to a method according to the present invention.

FIG. 4 shows schematically an example of the program sequence of scheduler 12 which accesses the information according to FIG. 2. In a first program step 101, a request is sent to the scheduler 12 for a certain module, e.g., module A here, to be processed in accordance with a state of system 2 or another condition, such as the fact that a certain period of time has elapsed. A subsequent program step 102 determines which states are observed by module A (states X, Y and Z) by polling the first storage device, as shown in FIG. 2. Another subsequent program step 103 determines which modules (B, C, D) interfere with these states (X, Y and Z). In addition, step 102 determines by polling the first storage device which states are interfered with by module A (none here). Program step 103 also checks to see which modules are observing the states so determined. Then by polling additional storage device, a subsequent program step 104 determines which of these modules which are interfered with by A or are in turn interfering with A (modules B, C, D) are currently active, and then on the basis of this information, a subsequent step 105 decides whether module A may be activated. If no interfering module (B, C, D) is active, and if no activated module is interfered with by activation of A, then the activation of module A is enabled so that module A is processed. Then another program step 106 notes in the second storage device that module A is activated. Various options are conceivable if a conflict with other modules that have already been activated occurs due to activation of module A. For example, scheduler 12 may then refuse to activate module A in step 105, so that module A would have to try again to report to the scheduler 12 at a later time. Another possibility is for scheduler 12 to decide in step 105 to inactivate an interfering module and then allow activation of module A. This can be decided, for example, on the basis of priorities assigned to the individual modules. In subsequent program step 106, the information regarding which modules are currently activated is then stored.

What is claimed is:

1. A control unit for a system having a plurality of activatable modules for generating information as a function of at least one of a plurality of states of the system, comprising:
   a first storage device for storing information relating to a mutual interference of the modules;
   a second storage device for storing state information regarding the modules, the state information indicating which of the modules are currently activated; and
   a scheduler for activating at least one of the modules and determining as a function of the information stored in the first storage device and the state information stored in the second storage device whether the mutual interference occurs if an additional module is activated, wherein the scheduler prevents a simultaneous activation of modules that interfere with each other;
   wherein the scheduler prevents the simultaneous activation of modules that interfere with each other by, in at least one case, interrupting an activated module and activating the additional module after the activated module is interrupted.

2. The control unit according to claim 1, wherein the system includes one of a motor vehicle, an engine, and a transmission.

3. The control unit according to claim 1, wherein the scheduler prevents the simultaneous activation of modules that interfere with each other by in at least one case, preventing an activation of the additional module.

4. The control unit according to claim 1, wherein the first storage device stores information regarding which modules interfere with one another when they are simultaneously activated.

5. The control unit according to claim 1, wherein the first storage device stores information regarding which states of the system correspond to which activated modules and which states of the system are interfered with by which activated modules.

6. The control unit according to claim 1, wherein each one of the modules and the scheduler includes a program to be processed by a microprocessor.

7. The control unit according to claim 1, wherein each one of the first storage device and the second storage device includes one of a plurality of tables and a plurality of matrices.

8. The control unit according to claim 1, wherein one of a set of functions appearing to a user as one unit and another set of functions being used to control a uniform function is divided into the modules and are managed separately by the scheduler.

9. A method of operating a control unit of a system for activating at least one of a plurality of modules in order to generate information regarding at least one of a plurality of states of the system, comprising the steps of:
   providing a first storage device for storing information relating to a mutual interference of the modules;
   providing a second storage device storing state information regarding the modules, the state information indicating which of the modules are currently activated;
   before an activation of an additional module is performed, determining as a function of the information stored in the first storage device and the state information stored in the second storage device whether the mutual interference occurs if the additional module is activated; and
   preventing a simultaneous activation of modules that interfere with each other;
   wherein the step of preventing the simultaneous activation of modules that interfere with each other includes the steps of interrupting an activated module and activating the additional module after the activated module is interrupted.

10. The method according to claim 9, wherein the system includes one of a motor vehicle, an engine and a transmission.

11. The method according to claim 9, further comprising:
    preventing the simultaneous activation of modules that interfere with each by preventing an activation of the additional module.

12. The method according to claim 8, wherein the steps of the method are executed by a program to be processed by a microprocessor.

13. A control unit for a system having a plurality of activatable modules for generating information as a function of at least one of a plurality of states of the system, comprising:
    a first storage device for storing information relating to a mutual interference of the modules;
    a second storage device for storing state information regarding the modules, the state information indicating which of the modules are currently activated; and
    a scheduler for activating at least one of the modules and determining as a function of the information stored in the first storage device and the state information stored in the second storage device whether the mutual interference occurs if an additional module is activated, wherein the scheduler prevents a simultaneous activation of modules that interfere with each other;
    wherein the first storage device stores information regarding which states of the system correspond to which activated modules and which states of the system are interfered with by which activated modules.

14. The control unit according to claim 13, wherein the system includes one of a motor vehicle, an engine, and a transmission.

15. The control unit according to claim 13, wherein the scheduler prevents the simultaneous activation of modules that interfere with each other by, in at least one case, preventing an activation of the additional module.

16. The control unit according to claim 13, wherein the first storage device stores information regarding which modules interfere with one another when they are simultaneously activated.

17. The control unit according to claim 13, wherein each one of the modules and the scheduler includes a program to be processed by a microprocessor.

18. The control unit according to claim 13, wherein each one of the first storage device and the second storage device includes one of a plurality of tables and a plurality of matrices.

19. The control unit according to claim 13, wherein one of a set of functions appearing to a user as one unit and another set of functions being used to control a uniform function is divided into the modules and are managed separately by the scheduler.

20. A method of operating a control unit of a system for activating at least one of a plurality of modules in order to generate information regarding at least one of a plurality of states of the system, comprising the steps of:
    providing a first storage device for storing information relating to a mutual interference of the modules, the information including information regarding which states of the system correspond to which activated modules and which states of the system are interfered with by which activated modules;

providing a second storage device storing state information regarding the modules, the state information indicating which of the modules are currently activated;

before an activation of an additional module is performed, determining as a function of the information stored in the first storage device and the state information stored in the second storage device whether the mutual interference occurs if the additional module is activated; and preventing a simultaneous activation of modules that interfere with each other.

21. The method according to claim 20, wherein the system includes one of a motor vehicle, an engine and a transmission.

22. The method according to claim 20, wherein the preventing step includes preventing an activation of the additional module.

23. The method according to claim 20, wherein the preventing step includes interrupting an activated module and activating the additional module after the activated module is interrupted.

24. The method according to claim 20, wherein the steps of the method are executed by a program to be processed by a microprocessor.

* * * * *